United States Patent [19]
Diekman et al.

[11] Patent Number: 4,583,755
[45] Date of Patent: Apr. 22, 1986

[54] BICYCLE FRAME

[75] Inventors: Robert L. Diekman; Timothy J. Dietz; Lloyd W. Docter; Verlon D. Downing, all of Centerville, Ohio

[73] Assignee: Huffy Corporation, Dayton, Ohio

[21] Appl. No.: 677,707

[22] Filed: Dec. 4, 1984

[51] Int. Cl.$^4$ .............................................. B62K 19/22
[52] U.S. Cl. .................... 280/281 R; 403/13; 403/292
[58] Field of Search ............ 280/281 R, 281 LP, 274; 403/265, 266, 292, 13

[56] References Cited

U.S. PATENT DOCUMENTS

| | | | |
|---|---|---|---|
| 582,138 | 5/1897 | Hedenberg | 280/281 R |
| 704,288 | 7/1902 | Anderson | 280/281 R |
| 2,024,782 | 12/1935 | Schwinn | 29/148.2 |
| 2,144,332 | 1/1939 | Glaser | 280/281 R |
| 2,267,330 | 12/1941 | Goss | 403/265 |
| 2,702,926 | 3/1955 | Rahaim | 403/298 |
| 2,746,769 | 5/1956 | Hoogendoorn | 280/287 |
| 3,030,124 | 4/1962 | Holloway | 280/281 R |
| 3,352,191 | 11/1967 | Crawford | 85/14 |
| 3,389,046 | 6/1968 | Burress | 161/194 |
| 3,405,592 | 10/1968 | Blodee | 85/14 |
| 3,756,635 | 9/1973 | Beers | 287/127 |
| 3,883,257 | 5/1975 | Dalafield | 403/172 |
| 3,966,230 | 6/1976 | Nicol | 280/281 R |
| 4,110,053 | 8/1978 | Buchholz | 403/361 |
| 4,128,356 | 12/1978 | Carlisle | 403/292 |
| 4,437,679 | 3/1984 | Campagnolo | 280/281 |
| 4,500,103 | 2/1985 | Klein | 280/281 |

FOREIGN PATENT DOCUMENTS

| | | |
|---|---|---|
| 540625 | 9/1955 | Belgium . |
| 877968 | 11/1979 | Belgium . |
| 79102691.7 | 2/1980 | European Pat. Off. . |
| 801888 | 12/1950 | Fed. Rep. of Germany . |
| 825500 | 12/1951 | Fed. Rep. of Germany . |
| 7102688 | 1/1971 | Fed. Rep. of Germany . |
| 7822966 | 7/1978 | Fed. Rep. of Germany . |
| 8117517 | 6/1981 | Fed. Rep. of Germany . |
| 8301136 | 1/1983 | Fed. Rep. of Germany . |
| 8307790 | 3/1983 | Fed. Rep. of Germany . |
| 938093 | 9/1948 | France . |
| 2523541 | 9/1983 | France ............. 280/281 R |
| 350655 | 7/1937 | Italy . |
| 575144 | 2/1946 | United Kingdom ....... 280/281 R |

Primary Examiner—John A. Pekar
Attorney, Agent, or Firm—Biebel, French & Nauman

[57] ABSTRACT

A bicycle comprising a plurality of lugged members, each having a plurality of substantially cylindrical stub inserts extending outwardly therefrom, and a plurality of hollow, substantially cylindrical tubes which receive the stub inserts in their ends and join the lugged members together to form the frame. Each of the stub inserts includes an inner portion having a first outside diameter and an outer, pilot portion having a second, smaller outside diameter. The tubes are sized such that their inside diameters form a slip-fit with the pilot portions and a press fit with the inner portions of the inserts. An appropriate metal adhesive is applied to the pilot portions to form a bond between the pilot portions and the tubes so that the frame components are held together by the adhesive bond as well as the press fit engagement between the inserts and tubes. The press fit engagement is such that the frame is capable of storage and handling prior to the setting up of the adhesive bond.

18 Claims, 8 Drawing Figures

BICYCLE FRAME

BACKGROUND OF THE INVENTION

The present invention relates to bicycle frames and, more particularly, to bicycle frames in which the components are joined together by means other than welding or brazing.

The frames for most lightweight touring or racing bicycles comprise a head tube which includes a sleeve for receiving the handlebar stem and fork stem, a bottom bracket which includes a sleeve for receiving the pedal crank assembly, and a seat bracket which includes an opening for receiving the seat post of the bicycle seat. These three components are joined together by single, cylindrical tubes which usually are joined to the components by welding or brazing.

The front wheel of the bicycle is attached to this frame by a front fork which includes a fork stem pivotally attached to the head tube. The rear wheel is attached to this frame by seat mast stays which extend from the seat bracket to the rear wheel, and a pair of chain stays which extend from the bottom bracket to the rear wheel. These two pairs of stays usually are attached to their respective brackets by welding or brazing.

In most bicycles of this design, the tubes, brackets and stays are made of steel, a material which is strong, inexpensive and relatively easy to weld or braze. However, there are other materials, such as aluminum alloys, which possess sufficient strength and rigidity and yet are lighter in weight than steel. Accordingly, to minimize the weight of the frame, it is desirable to construct a bicycle frame in which aluminum alloy tubes are substituted for some or all of the components. Due to their sizes, it is especially desirable to substitute aluminum for the steel in the tubes joining the brackets. Since the techniques for joining a steel component to an aluminum one by welding or brazing are impracticable for mass production, alternate means of constructing such frames have been utilized.

For example, a bicycle frame is disclosed in the Kleinebenne Gebrauchsmuster No. G 81 17 517.5 in which tubular members are attached to the head tube, bottom bracket and seat bracket by gluing. The head tube and each of the brackets include sockets into which are pressed, soldered or welded tubular "appendages" having tapered ends. The ends of the tubes are complementarily tapered and sized to slip over the appendages. The tubes are secured to the appendages by an anaerobic adhesive which hardens and solidifies to prevent relative movement of the parts without actually bonding to them, thereby forming a mechanical interlock. In a preferred embodiment, the two ends and appendages include circumferential grooves which together form annular passages for holding adhesive, in addition to the adhesive held in the gaps or pockets between the appendages and the tubes.

In an alternate embodiment of that device, the tubular appendages are cylindrical in shape and include roughened outer surfaces which create minute pockets for the adhesive. The appendages are sized to provide a slight press fit along substantially their entire length. With this embodiment, the frame components are held together initially by the slight press fit, then primarily by the hardened adhesive which fills the gaps between the tube ends and the appendages attached to the head tube and brackets.

While this type of frame construction allows dissimilar metals to be used and therefore enables frames to be constructed which are lighter in weight than correspondingly shaped frames which are made entirely of steel, there are disadvantages. For example, the annular passages on the conical appendages hold glue in an annular pattern, so that the adhesive solidifies in the form of rings. While such a pattern provides resistance to tensile forces acting on the connection, it is not as effective in resisting torsional forces.

In addition, in those frames in which the inserts include roughened surfaces that engage the connecting tubes with a press fit, it is dificult to ensure that the adhesive is evenly distributed about the periphery of the appendages, and often the act of inserting an appendage into a tube scrapes adhesive away from portions of the periphery, creating voids. Furthermore, it is often difficult to join a tube end to an appendage so that the end engages the socket wall to form a continuous connection. Difficulties in this respect result from normal variations in assembly and in the dimensions of the components. Failure to provide a proper connection results in the presence of gaps between the tube and the socket which detract from the aesthetic appearance of the frame, and in the presence of sharp edges which may injure the rider of the bicycle.

Accordingly, there is a need for a bicycle frame which is capable of being fabricated of components made of dissimilar metals such as steel and aluminum, without need of expensive and time-consuming brazing operations. There is also a need for a bicycle frame in which the components can be assembled rapidly and inexpensively with a uniformly strong connection between the tubes and appendages. Such a frame should also be capable of assembly so that there are no unsightly gaps between the frame components and the likelihood of sharp edges existing in the finished frame is small.

SUMMARY OF THE INVENTION

The present invention is a bicycle frame in which the head tube, seat bracket and bottom bracket each include a pair of stub inserts extending outwardly therefrom and are joined together by tubes which are attached to the inserts of the head tube and brackets by a combination of a press fit and an adhesive bond. Since the structure of the head tube, seat bracket and bottom bracket are essentially the same with respect to their connections with the frame tubes in that each includes at least two lugs in the form of the stub inserts, these components may be referred to generally as "lugged members".

Each stub insert of the lugged members includes an inner portion having a first outside diameter and an outer pilot portion having a second outside diameter less than the first diameter. The connecting tubes are sized so that they form a slip fit with the pilot portions and a press fit with the inner portions of the stub inserts. Preferably, the inside diameters of the tube ends are greater than the outside diameters of the pilot portions but less than the outside diameters of the inner portions of the stub inserts.

A metal adhesive is applied to the pilot portions and forms a bond between the pilot portions and the overlying portions of the tube ends. Thus, each of the lug members is attached to its associated tubes by an adhesive bond as well as a press fit.

In a preferred embodiment, the pilot portions of the stub inserts each include a plurality of longitudinally extending grooves which are evenly spaced about the peripheries of the pilot portions. Each of the pilot portions also includes an annular groove which extends about the periphery of the portion at the transition from the pilot portion to the inner portion of the stub insert. The annular and longitudinal grooves form sections having an outside diameter which is less than the second outside diameter of the pilot portion and provide pockets for the metal adhesive, thereby reducing the likelihood that the adhesive is scraped away from the pilot portion by the act of slip fitting the tube ends over the pilot portions and ensuring the even distribution of adhesive along the length of and about the periphery of each pilot portion. An additional advantage of providing grooves in the pilot portions of the inserts is that the thickness of the adhesive may be maintained at an optimum value by sizing the depths of the grooves appropriately.

In addition to ensuring that the adhesive is evenly distributed about the pilot portions, the longitudinal grooves provide sections of adhesive which extend parallel to the axes of the tubes and resist torsional stresses exerted upon the connection between the tube and the insert. An additional benefit of the adhesive is that it provides a cushion between the stub inserts and the tubes which helps to dampen shocks exerted upon the bicycle frame.

An advantage of the frame construction of the present invention over prior art frames is that the shape of the inserts facilitate assembly of the frame. The frame components may be joined together loosely by inserting the pilot portions of the lugged members into the ends of the tubes in a slip fit engagement, then the frame in this condition may be placed on a jig or fixture to effect the press fit engagement of the tube ends with the inner portions of the inserts.

To ensure a strong and uniform press fit, it is necessary to size the wall thickness of the tubes such that expansion of the tube ends forms the press fit, rather than compression of the stub inserts. When aluminum alloy tubes are pressed over steel inserts, the tube wall thickness may be comparable to the wall thickness of the insert, since the aluminum alloy of the tube is more readily deformable than the steel of the insert. However, the frame construction of the invention may utilize steel tubes or tubes of other metals, as well as lugged members of materials other than steel, provided that the tubes deform more readily than the inserts. Regardless of the materials used, it is also desirable to dimension the components so that the tubes are not expanded beyond their elastic limit, since to do so would reduce the strength of the press fit.

In the preferred embodiment, the tube ends are squared and the base of each of the stub inserts includes a squared shoulder so that, when press fitted over the inner portion of the stub inserts, the tube ends abut the shoulders. In order to compensate for dimensional variations and misalignments which normally occur with such components, trim rings are provided and are positioned between the squared shoulders and the squared ends of the lugged members and tubes, respectively. The trim rings are made of a material which is softer than the materials of either the lugged members or the tubes so that they may deform or compress to fill any gaps which might exist between the joined components. Therefore, the trim rings enable the bicycle frame components to be assembled rapidly and yet provide a finished product which is aesthetically pleasing and free of any sharp edges which might exist between joined components.

Accordingly, it is an object of the present invention to provide a bicycle frame which may be fabricated from lugged members and tubes which are joined by means other than soldering or brazing; a bicycle frame in which the components are secured together by an adhesive bond which is uniformly distributed over the connecting surfaces of the components and is not disturbed by the act of assembling the frame; a bicycle frame in which the components are joined together by connections which provide a press fit connection in addition to an adhesive bond so that the frame may be removed from a fixture and stored while the adhesive sets; and a bicycle frame in which the components are pressed together and the connections are free from unsightly gaps or sharp edges.

Other objects and advantages of the present invention will become apparent from the following description, the accompanying drawings and the appended claims.

DETAILED DESCRIPTION OF THE PREFERRED EMBODIMENTS

Figure 1:
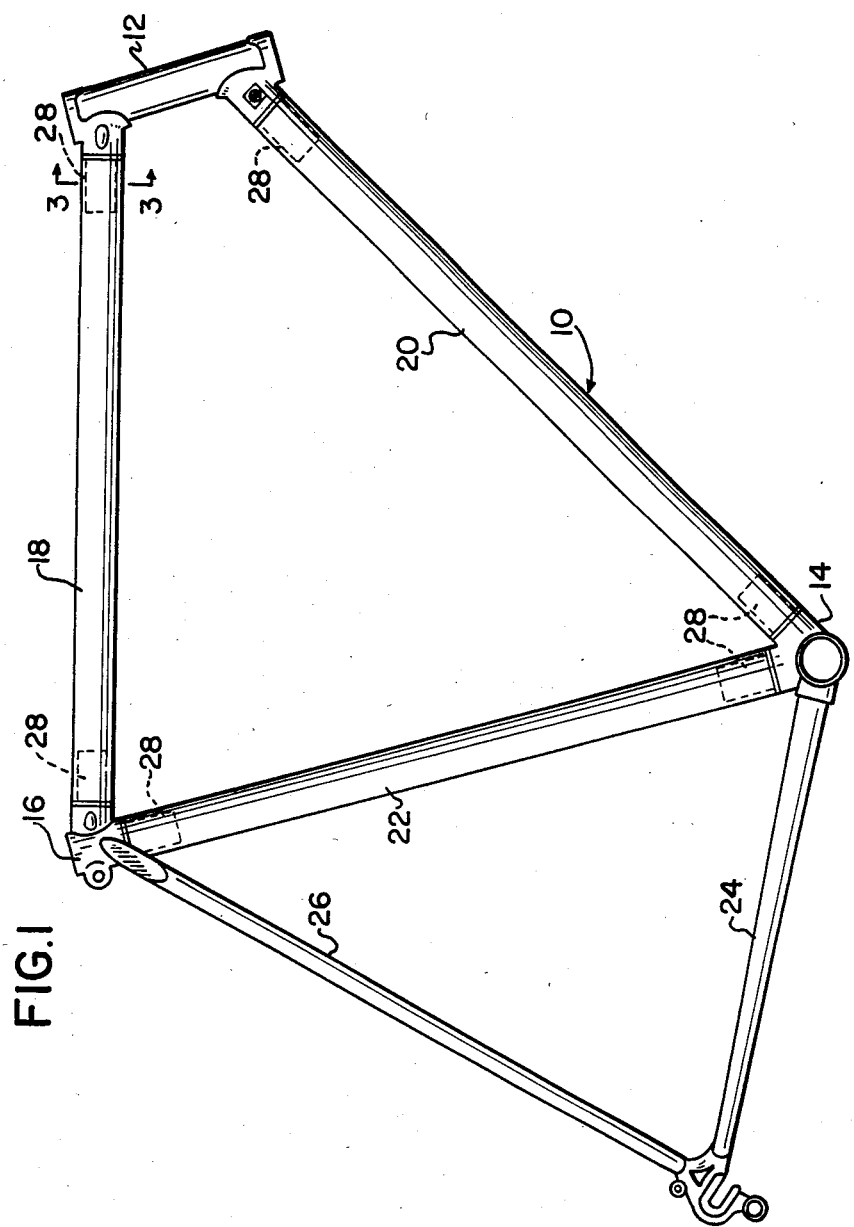
FIG. 1 is a side elevation of the preferred embodiment of the bicycle frame of the present invention.

As shown in FIG. 1, the bicycle frame of the present invention, generally designated 10, includes three lugged members consisting of a head tube 12, a bottom bracket 14 and a seat bracket 16. The head tube 12 is of the type adapted to pivotally receive a handlebar stem (not shown) in its upper end and a fork stem (not shown) in its lower end. The bottom bracket 14 is the type adapted to rotatably receive a crank assembly (not shown), and the seat bracket 16 is of the type adapted to receive a seat post (not shown) therethough.

The head tube 12 and seat bracket 16 are joined by a top tube 18, the head tube and bottom bracket 14 are joined by a down tube 20 and the seat bracket and bottom bracket are joined by a seat mast 22. The tubes 18, 20, 22 are each hollow and substantially cylindrical in shape. They may have identical inside diameters, although this is not essential to the invention.

The frame 10 also includes a pair of chain stays 24 which extend rearwardly from the bottom bracket 14 and a pair of seat mast stays 26 which extend downwardly and rearwardly from the seat bracket 16. The chain stays 24 and seat mast stays 26 are attached to their respective brackets 14, 16 by brazing and, in this respect, the frame 10 is similar in construction to many high quality racing and touring bicycle frames. However, the chain stays 24 and seat mast stays 26 may be attached to their respective brackets 14, 16 in the same manner as the connections between the tubes 18, 20, 22 and the lugged members 10, 12, 14, which will be described hereafter, without departing from the scope of the invention.

Each of the lugged members includes a pair of stub inserts 28, shown in broken lines in FIG. 1, which telescope into and are secured to the ends of the tubes 18, 20, 22. The structures of the stub inserts 28 of the lugged members 10, 12, 14 are identical, as are the structures of the connections between the tubes 18, 20, 22 and the lugged members. Accordingly, the following description of the structure of the frame 10 will be described with reference only to the connection between the top tube 18 and head tube 12, with the understanding that this description applies equally to the other components and connections of the frame.

Figure 2:
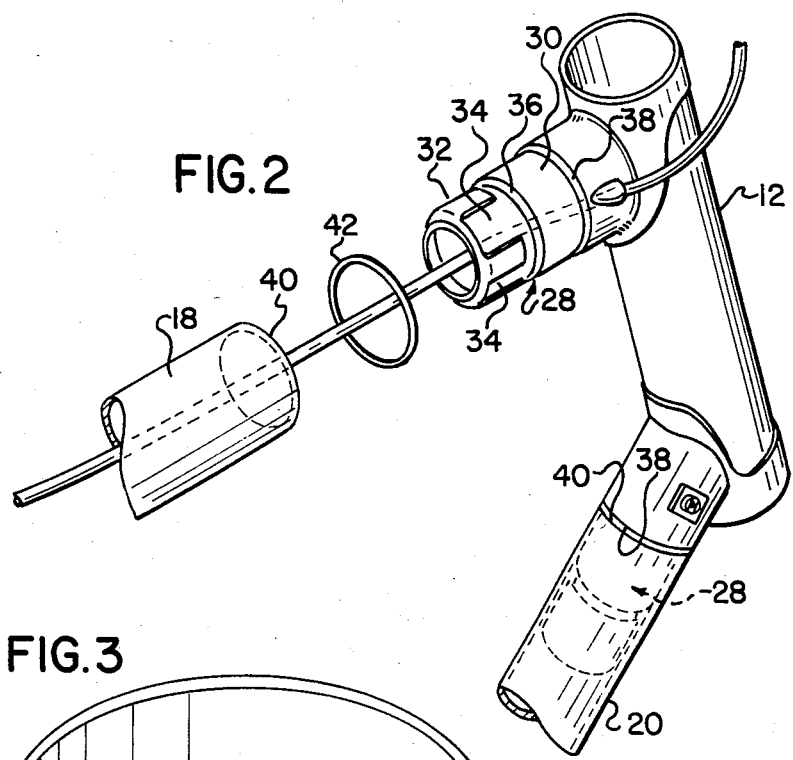
FIG. 2 is a detail in perspective of the head tube of the frame of FIG. 1 in which the top tube is exploded away from its associated stub insert.
Figure 3:
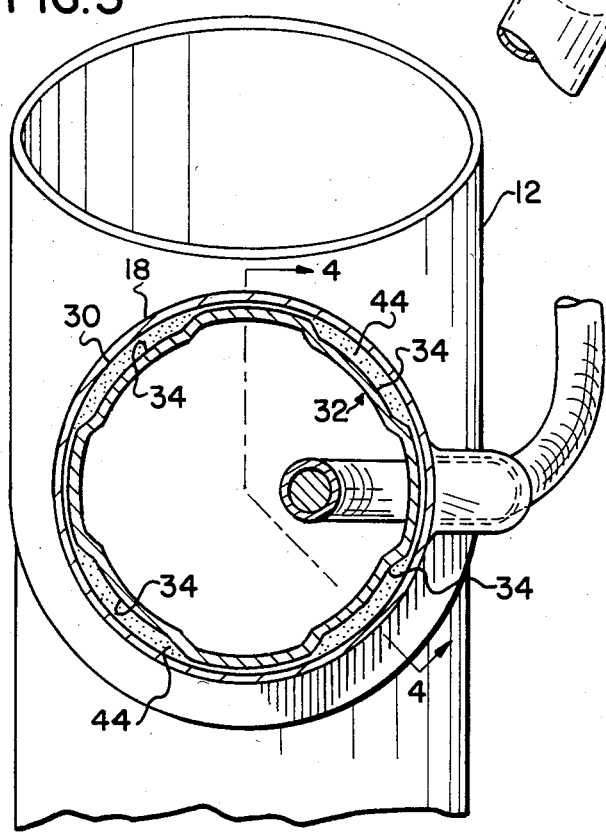
FIG. 3 is a detail taken at line 3—3 of FIG. 1 in which the stub insert and top tube are in section.

As shown in FIGS. 2 and 3, the stub inserts 28 are formed integrally with the head tube 12. However, it is within the scope of the invention to provide a head tube with the appropriate sockets into which the stub inserts 28, formed as a separate tubular piece, could be inserted and attached by means such as press fitting, welding, brazing or by an adhesive. The stub insert 28 is substantially cylindrical in shape and includes an inner portion 30, having a first outside diameter, and an outer, pilot portion 32 having a second outside diameter which is less than the first outside diameter. The pilot portion 32 terminates in a beveled end and includes four longitudinally extending grooves 34 and an annular groove 36 which is located at a chamfered transition 37 between the pilot portion and the inner portion 30. The grooves 34, 36 form segments of a reduced diameter which is less than the second outside diameter of the pilot portion 32.

Figure 6:
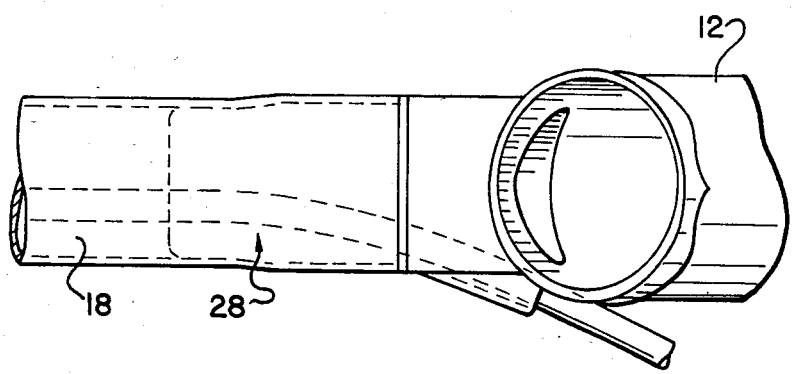
FIG. 6 is a top plan view of the detail of FIG. 4 taken at line 6—6 of FIG. 4.

The base of the stub insert 28 includes a squared, annular shoulder 38, the thickness of which preferably approximates the wall thickness of top tube 18. The top tube 18 includes a squared end 40 which is open and has an inside diameter sized to form a slip fit with the pilot portion 32 and a press fit with the inner portion 30. When assembled as shown in FIGS. 3 and 6, the squared end 40 of the tube abuts the squared shoulder 38 of the head tube 12. However, because of slight but unavoidable variations in the shapes and dimensions of the squared end 40 and the squared shoulder 38, it is possible that the connection between the top tube 18 and head tube 12 will form gaps or expose sharp edges which are unacceptable from an aesthetic or safety standpoint.

Accordingly, a trim ring 42 is provided and is sized to seat against the squared shoulder 38 and abut the squared end 40. The trim ring 42 preferably is made of a material which is softer than either of the materials of the top tube 18 or head tube 12 so that it may deform at those points at which the gap between the squared end 40 and squared shoulder 38 are relatively small. The trim rings 42 eliminate the need for a precise connection between the tubes 18, 20, 22 and their respective squared shoulders 38, or for filler material to close the gap, so that the tolerances required for a frame 10 of acceptable quality are reduced, thereby reducing the costs of manufacturing the components and the time required to assemble the components into a finished frame.

As best shown in FIG. 3, a metal adhesive 44 is applied to the longitudinal grooves 34 and annular groove 36 of the pilot portion 32, and forms an adhesive bond between the pilot portion and the inner wall of the top tube 18. An appropriate adhesive is Permabond ESP Grade 110, manufactured by National Starch & Chemical Corp., Englewood, N.J. It should be noted that the grooves 34, which are evenly spaced about the pilot portion 32, and the groove 36 ensure the even distribution of adhesive about the periphery of the pilot portion 32, which results in a stronger bond between the stub insert 28 and top tube 18. Furthermore, the adhesive 44 attaches to the sides of the grooves 34 as well as the bottoms of the grooves and thereby provides increased resistance to torsional stresses exerted upon the connection.

Another advantage of the grooves 34, 36 is that since the depth of the grooves closely approximates the thickness of the adhesive bond 44 between the pilot portion 32 and the top tube 18, the thickness of the adhesive bond can be controlled by varying the depth of the groove so that an optimum adhesive thickness can be maintained at each connection between a lugged member and a tube of the frame. Since the slip fit of the tube 18 over the pilot portion 32 does not result in contact between the tube and grooves 34, 36, this adhesive thickness is not disturbed by the act of assembling the tubes and lugged members of the frame.

Figure 5:
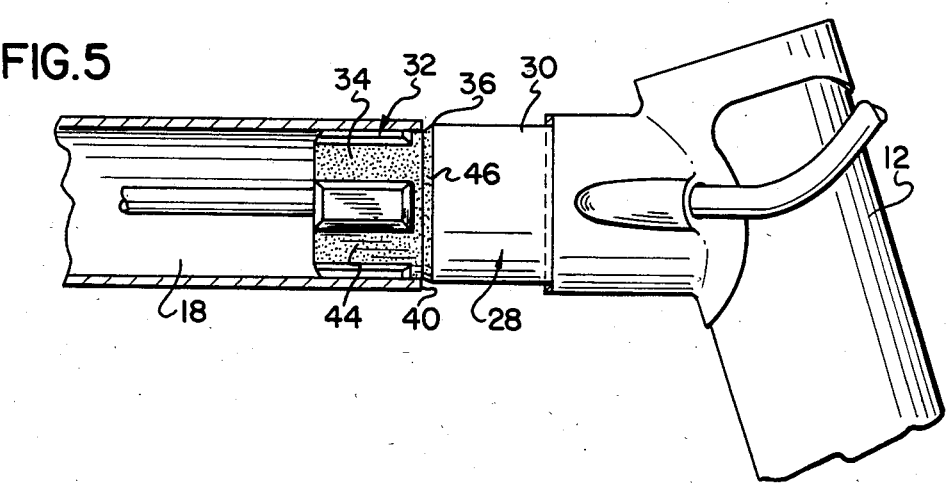
FIG. 5 is the detail of FIG. 4 in which the top tube is engaging only the pilot portion of the stub insert.

To assemble the frame 10, the head tube 12, bottom bracket 14 and seat bracket 16 are first prepared for assembly by mounting trim rings 42 against the squared shoulders 38 of each of the stub inserts 28. Adhesive 44 in an uncured state is then applied to the grooves 34, 36 of each of the pilot portions 32 of the stub inserts 28. The frame is then somewhat loosely connected by inserting the pilot portions 32 of each of the stub inserts 28 into the open squared ends 40 of the appropriate tubes 18, 20, 22, as shown for the head tube 12 and top tube 18 in FIG. 5 in a slip fit. At this time, the squared end 40 rests against the chamfered transition 37 of each of the stub inserts 28.

Figure 4:
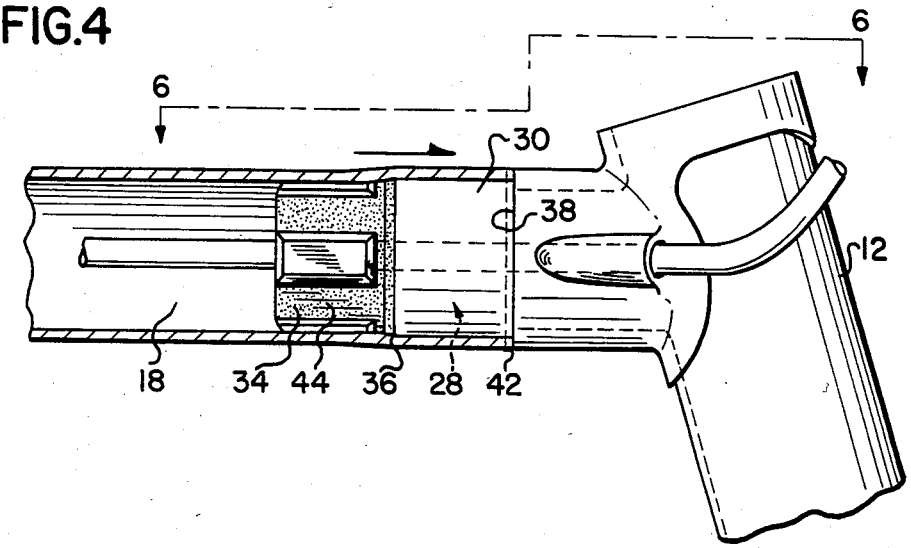
FIG. 4 is a side elevation of the detail shown in FIG. 3 in which the top tube is in section, taken at line 4—4 of FIG. 3.

The squared ends 40 are then pressed over the inner portions 30 of the stub inserts 28 of each of the lugged members 12, 14, 16 until the squared ends clamp the trim rings 42 against the squared shoulders 38, as shown for the top tube 18 and head tube 12 in FIGS. 4 and 6. The pressing of the tubes 18–22 over their associated inner portions 30 may be achieved by sequentially and iteratively compressing two of the lugged members in a press so as to gradually press fit the tube ends 40 onto their respective inner portions 30, or by mounting the frame on a jig or fixture designed for such purpose.

Once the pressing operation has been completed, the connection between the lugged members 12–16 and their respective tubes 18–22 is sufficiently strong that the frame 10 may be transported and stored for later setting of the adhesive, or placed in a curing furnace, without the necessity of clamping the components in a jig or other fixture to maintain their spatial relationship.

In one embodiment actually constructed, the stub inserts 28 were made of C1010 steel with a wall thickness of 0.047 inches (1.2 mm) and their inner portions 30 had a (first) outside diameter of 1.160 inches (29.5 mm). The pilot portions 32 had (second) outside diameters of 1.144 inches (29.05 mm). The tubes 18–22 were fabricated from standard 2024 T3 aluminum and had outside diameters of 1.25 inches (31.75 mm) and inside diameters of 1.152 inches (29.26 mm), resulting in a press fit of between 0.008 and 0.009 inches (0.20 and 0.23 mm). The depth of the grooves which was optimum for the aforementioned Permabond adhesive was 0.033 inches. With an axial length of approximately 1 inch (25.4 mm), such a press fit imparted sufficient stiffness and rigidity to the frame to enable the frame to be handled without a jig or fixture prior to the setting up of the adhesive. The aluminum alloy of the tubes was deformed to make the press fit, but not beyond its elastic limit.

Again, once the adhesive 44 has cured, each connection between a tube and a lugged member is effected by adhesive bonding as well as the interference fit of the tube with the inner portion 30 of the stub insert 28. With this frame, the trim rings 42 may be made of a relatively soft material such as zero temper aluminum or a nylon.

Figure 7:
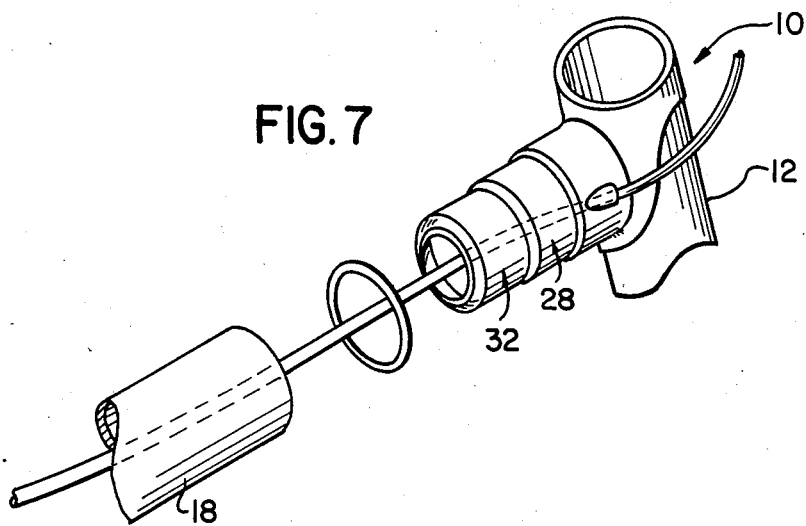
FIG. 7 is a detail of a frame of an alternate embodiment of the invention in which the top tube is exploded from the stub insert of the head tube.
Figure 8:
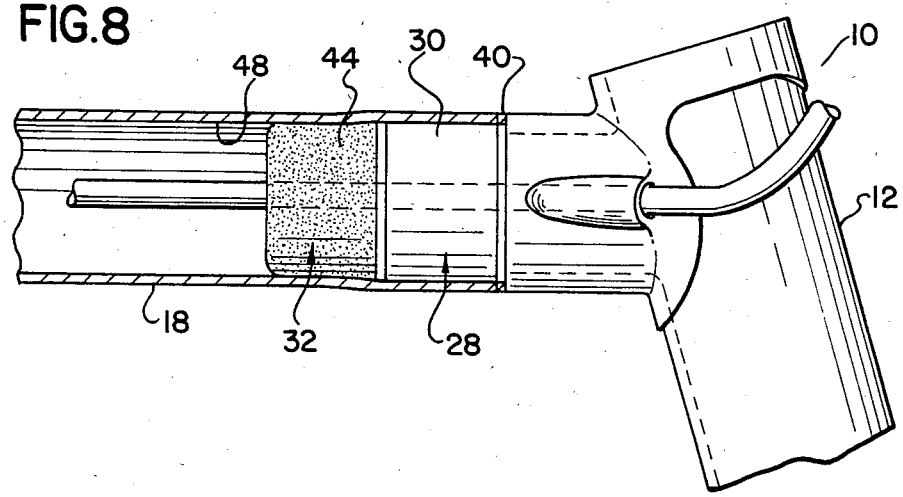
FIG. 8 is a side elevation of the embodiment in FIG. 7 in which the top tube is in section.

An alternate embodiment is shown in FIGS. 7 and 8. In that embodiment, the lugged members, shown in a representative fashion by the head tube 12', each include a stub insert 28' having a pilot portion 32' which is substantially smooth and cylindrical about its outer surface. Although the bond formed by the adhesive 44' may not be as uniform as it is when used with the pilot portion 32 of FIGS. 1-6, the bond is sufficiently strong, provided larger quantities of adhesive are used. An advantage of the pilot portion 32' of this embodiment is that it is less expensive to fabricate than a grooved pilot portion.

In this mode of assembly, the adhesive is evenly distributed prior to engagement of the tube 18' with the stub insert 38', and the sliding contact between the tube end 40' and the inner portion 30' acts to scrape the adhesive 44' from the squared end 40' of the tube 18' so that it collects in the region between the interior wall 48 of the tube and the pilot portion 32'. Once the press fitting operation has been completed for this embodiment, the frame 10' can be stored or placed in a curing area to effect the setting up of the adhesive 44'. Again, the pilot portion 32' may be dimensioned such that the gap formed between the pilot portion and the tube 18' approximates the optimum thickness of the adhesive 44' to ensure a strong adhesive bond.

While the forms of apparatus herein described constitute preferred embodiments of this invention, it is to be understood that the invention is not limited to these precise forms of apparatus, and that changes may be made therein without departing from the scope of the invention.

What is claimed is:

1. A bicycle frame comprising:
a plurality of lugged members, each having a plurality of substantially cylindrical stub inserts extending outwardly therefrom, each of said inserts having a first outside diameter and a pilot portion at an outer end thereof, said pilot portion having a second outside diameter less than said first outside diameter and longitudinally extending groove means forming segments having a diameter less than said second outside diameter;
a plurality of hollow, substantially cylindrical tubes extending between and joining said lugged members together, each of said tubes having a first open end with an inside diameter sized to telescope over and form an interference fit with a selected one of said inserts of one of said lugged members and a slip fit with said pilot portion thereof, and a second, opposite open end with an inside diameter sized to telescope over and form an interference fit with a selected one of said inserts of another of said lugged members and a slip fit with a pilot portion thereof, such that each of said tubes extends between two of said lugged members and is attached thereto by interference fits of said open ends over said stub inserts thereof; and
adhesive means attached to and forming a bond between outer surfaces of said pilot portions and inner surfaces of said tube open ends.

2. The frame of claim 1 wherein each of said pilot portions includes a circumferential groove forming an annular segment having a diameter less than said second outside diameter.

3. The frame of claim 2 wherein said adhesive means is positioned within said groove means and said circumferential groove; and said groove means and groove form a gap with said tube having a depth substantially equal to an optimal thickness of said adhesive means.

4. The frame of claim 1 wherein each of said lugged members includes an annular shoulder extending about a base of each of said stub inserts; each of said tube ends is squared; and said tube ends form butt joints with said annular shoulders.

5. The frame of claim 1 further comprising a plurality of trim rings, each of said rings being mounted on one of said inserts and positioned in abutting relation with said annular shoulder and said squared end of associated ones of said lugged members and said tubes.

6. The frame of claim 5 wherein each of said rings has an outside diameter substantially equal to an outside diameter of an adjacent one of said tube ends.

7. The frame of claim 6 wherein each of said rings is made of a material more flexible than materials comprising said tubes and said annular shoulders.

8. The frame of claim 7 wherein said rings are made of aluminum.

9. The frame of claim 8 wherein each of said stub inserts includes an outer, beveled end.

10. The frame of claim 1 wherein each of said stub inserts is formed to provide a strength in resistance to radial compression greater than a strength of said tube ends in resistance to radial expansion, such that said tube ends are more readily deformable than said inserts and radial expansion of said tube ends substantially effects said interference fit with said stub inserts.

11. The frame of claim 10 wherein said lugged members are made of steel and said tubes are made of an aluminum alloy.

12. The frame of claim 10 wherein said radial expansion of said tube ends is less than an amount of expansion required to cause said tube ends to expand beyond their elastic limits.

13. A bicycle frame comprising:
a plurality of lugged members including a head tube adapted to receive a handlebar and front fork assembly, a bottom bracket adapted to receive a crank assembly, and a seat bracket adapted to receive a seat post;
each of said lugged members including a plurality of substantially cylindrical stub inserts, each having an outer pilot portion and an inner portion, said inner portion having a first outside diameter and said pilot portion having a second outside diameter less than said first diameter; and
a plurality of tubes joining said lugged members together, each having opposing, substantially cylindrical open ends telescoping over selected ones of said stub inserts and having inside diameters sized to form a slip fit with said pilot portions and an interference fit with said inner portions.

14. The frame of claim 13 further comprising adhesive means positioned to form a bond between said pilot portions and surrounding portions of said tubes.

15. The frame of claim 14 wherein said pilot portions include recess means for receiving said adhesive means.

16. A bicycle frame comprising:
a plurality of lugged members including a head tube adapted to receive a handlebar and front fork assembly, a bottom bracket adapted to receive a crank assembly, and a seat bracket adapted to receive a seat post;
each of said lugged members including a pair of substantially cylindrical stub inserts, each having a squared shoulder at a base thereof, an inner portion with a first outside diameter, and an outer pilot portion having a second outside diameter less than said first diameter;
said pilot portions each having a plurality of longitudinal grooves evenly spaced thereabout, and a circumferential groove, said grooves forming a segment having a diameter less than said second diameter;
a plurality of substantially cylindrical tubes joining said lugged members together, each having opposing, squared open ends telescoping over selected ones of said stub inserts and having an inside diameter sized to form a slip fit with said pilot portions and an interference fit with said inner portions;
adhesive means located in said grooves for forming a bond between said pilot portions and said tubes; and
a plurality of annular trim rings positioned between said squared ends and said squared shoulders, said rings being made of a material more flexible than materials used to form said tubes and said lugged members.

17. A bicycle frame comprising:
a lugged member having a cylindrical stub insert extending outwardly therefrom, said inserts having an inner portion having a first outside diameter, an outer, pilot portion having a second outside diameter less than said first outside diameter, a chamfered transition between said inner and pilot portions, and an annular shoulder at a base of said inner portion;
tube means having a tubular end telescoping over said stub insert and terminating in a squared end abutting said shoulder, said tubular end having an inside diameter sized to form a slip fit with said pilot portion and an interference fit with said inner portion; and
adhesive means bonding said pilot portion to said tubular end.

18. A frame for a bicycle or the like, comprising:
lugged means having a substantially cylindrical stub insert extending outwardly therefrom and having an inner portion with a first outside diameter and an outer pilot portion having a second outside diameter less than said first outside diameter and longitudinally extending groove means forming segments having a diameter less than said second outside diameter;
tube means having a tubular end telescoping over said stub insert and having an inside diameter sized to form a slip fit with said pilot portion and an interference fit with said inner portion; and
adhesive means bonding said pilot portion to said tubular end.

* * * * *